United States Patent
Kim et al.

(10) Patent No.: US 12,545,194 B2
(45) Date of Patent: Feb. 10, 2026

(54) VARIABLE WHEEL ARCH GARNISH AND CONTROL METHOD THEREOF

(71) Applicants: HYUNDAI MOTOR COMPANY, Seoul (KR); KIA CORPORATION, Seoul (KR)

(72) Inventors: Un-Tae Kim, Suwon-si (KR); Gyeong-Min Hwang, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 379 days.

(21) Appl. No.: 18/244,540

(22) Filed: Sep. 11, 2023

(65) Prior Publication Data

US 2024/0399980 A1    Dec. 5, 2024

(30) Foreign Application Priority Data

Jun. 1, 2023    (KR) ........................ 10-2023-0071153

(51) Int. Cl.
*B60R 13/04*    (2006.01)
*B62D 35/00*    (2006.01)

(52) U.S. Cl.
CPC ............ *B60R 13/04* (2013.01); *B62D 35/008* (2013.01)

(58) Field of Classification Search
None
See application file for complete search history.

(56) References Cited

U.S. PATENT DOCUMENTS

| | | | |
|---|---|---|---|
| 10,562,468 B2 * | 2/2020 | Zentgraf | B62D 25/18 |
| 2008/0100071 A1 * | 5/2008 | Browne | B62D 25/182 |
| | | | 292/341.17 |
| 2022/0258809 A1 * | 8/2022 | Kim | B62D 37/02 |
| 2024/0001867 A1 * | 1/2024 | Alneri | B60R 13/04 |

FOREIGN PATENT DOCUMENTS

| | | | | |
|---|---|---|---|---|
| DE | 102016000382 A1 * | 7/2016 | ........... | B62D 35/001 |
| KR | 20210149397 A * | 12/2021 | ........... | B62D 35/008 |

* cited by examiner

*Primary Examiner* — Peter D Nolan
*Assistant Examiner* — Jacob Kent Besteman-Street
(74) *Attorney, Agent, or Firm* — MCDONNELL BOEHNEN HULBERT & BERGHOFF LLP

(57) ABSTRACT

A variable wheel arch garnish assembly includes a wheel arch garnish mounted on an outer surface of a wheel arch which surrounds a wheel and is connected to a vehicle body, and a flap rotatably coupled to an outer surface of the wheel arch garnish, wherein, when the flap is rotated and controlled to be opened in a side direction of the vehicle, the flap changes a direction of an air flow from a front side of the vehicle. It is possible to improve fuel efficiency by improving aerodynamic performance while maintaining a masculine design.

18 Claims, 11 Drawing Sheets

<LOW SPEED (0~50kph)>

<MEDIUM SPEED (50kph~100kph)>

<HIGH SPEED (100 KPH OR MORE)>

<NON-OPERATING OF FLAP WHEN TRAVELING STRAIGHT AHEAD>

<OPERATING OF LH FLAP ONLY IN PROPORTION TO STEERING ANGLE WHEN STEERING IN LH DIRECTION>

<OPERATING OF RH FLAP ONLY IN PROPORTION TO
STEERING ANGLE WHEN STEERING IN RH DIRECTION>

VARIABLE WHEEL ARCH GARNISH AND CONTROL METHOD THEREOF

CROSS REFERENCE TO RELATED APPLICATIONS

This application claims priority to Korean Patent Application No. 10-2023-0071153, filed on Jun. 1, 2023, which is incorporated herein by reference in its entirety.

BACKGROUND

Field

Exemplary embodiments of the present disclosure relate to a wheel arch garnish mounted on a vehicle, and more particularly, to a variable wheel arch garnish and a control method thereof.

Description of Related Art

Recently, the popularity of sport utility vehicles (SUVs) and pickup trucks is rapidly increasing due to the increase in demand for leisure and camping activities.

In particular, in North America, the sales ratio of pickup trucks is very high, and global automakers are fiercely competing to expand their pickup truck market share.

The most popular vehicle type among these pickup trucks has a boxy and muscled masculine design with a vehicle height and huge tires.

Thus, it is characterized by applying a negative volume so that a wheel arch garnish on an outer surface of a wheel arch goes inside the vehicle to make the tire look large and massive.

With these design elements, a unique image of the vehicle can be generated by giving the effect that the tire looks grander and protrudes than an actual size.

However, since the design of this shape greatly deteriorates aerodynamic performance, fuel economy of the pickup truck, in general, is inevitably very low.

With the recent surge in gasoline prices, the importance of fuel efficiency is increasing in the pickup trucks as well. Thus, manufacturers are making various efforts to improve the fuel efficiency of pickup trucks by introducing a new PT such as a hybrid.

According to the related art, in order to improve aerodynamic performance, there is a technique for reducing a gap between a tire and a wheel arch (Korean Patent Laid-Open Application No. 10-2021-0149397).

The contents described in the above Description of Related Art are to aid understanding of the background of the present disclosure and may include what is not previously known to those skilled in the art to which the present disclosure pertains.

SUMMARY

An embodiment of the present disclosure is directed to providing a variable wheel arch garnish assembly capable of improving fuel efficiency by improving aerodynamic performance while maintaining a masculine design, and a control method thereof.

Other objects and advantages of the present disclosure can be understood by the following description and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, there is provided a variable wheel arch garnish assembly including a wheel arch garnish mounted on an outer surface of a wheel arch which surrounds a wheel and is connected to a vehicle body, and a flap rotatably coupled to an outer surface of the wheel arch garnish, wherein, when the flap is rotated and opened in a side direction of the vehicle, the flap changes a direction of an air flow from a front side of the vehicle.

In addition, variable wheel arch garnish assembly may further include an actuator coupled to a rear surface of the wheel arch garnish, a driving rod of the actuator may be coupled to a rear surface of the flap, and the flap may be rotated as the driving rod is stretched and retracted.

Here, a degree of opening of the wheel arch garnish may be separately controlled under the control of the actuator.

In addition, the flap may be rotatably coupled to an outer surface of a front portion of the wheel arch garnish.

Meanwhile, a flap mounting groove may be formed on the wheel arch garnish, fastening hinges may be formed to protrude from both ends of the flap, and the fastening hinges may be inserted into hinge grooves formed on groove surfaces of both sides of the flap mounting groove.

In addition, when the flap is closed, an outer surface of the flap and the outer surface of the wheel arch garnish may be formed in parallel.

In accordance with another embodiment of the present disclosure, there is provided a control method of the variable wheel arch garnish assembly, which includes comparing a vehicle speed of the vehicle with a first reference value while the vehicle is traveling, and, when the vehicle speed exceeds the first reference value, operating the actuator to control the flap to be opened.

In addition, the control method may further include, when the vehicle speed is less than or equal to the first reference value in the comparing of the vehicle speed with the first reference value, controlling the flap to be closed.

Here, in the operating of the actuator to open the flap, a degree of opening of the flap may be separately controlled.

In addition, the operating of the actuator to open the flap may include comparing a vehicle speed of the vehicle with a second reference value, and, when the vehicle speed exceeds the second reference value, controlling the flap at a maximum opening angle.

In addition, the operating of the actuator to open the flap may include, when the vehicle speed is less than or equal to the second reference value, controlling the flap at an intermediate opening angle that is less than the maximum opening angle In accordance with still another embodiment of the present disclosure, there is provided a control method of the variable wheel arch garnish assembly, which includes determining whether the vehicle is turning while the vehicle is traveling, and, when the vehicle is in a turning traveling state, operating the actuator to open the flap.

As the determination result of whether the vehicle is turning, when the vehicle is in a straight traveling state, the control method may further include closing the flap.

In particular, in the operating of the actuator to open the flap, a degree of opening of the flap may be separately controlled.

In addition, the operating of the actuator to open the flap may include, when the vehicle is in a turning driving state to left, opening a flap, which is mounted on a left side of the vehicle among the flaps.

Here, in the opening of the flap, which is mounted on the left side of the vehicle, the flap mounted on the left side of the vehicle may be proportionally opened in proportion to a left turning steering angle of the vehicle.

In addition, the operating of the actuator to open the flap may include, when the vehicle is in a turning driving state to right, opening a flap, which is mounted on a right side of the vehicle among the flaps.

In addition, in the opening of the flap, which is mounted on the right side of the vehicle, the flap mounted on the right side of the vehicle may be proportionally controlled to be opened in proportion to a right turning steering angle of the vehicle.

DETAILED DESCRIPTION

In order to fully understand the present disclosure and operational advantages of the present disclosure and objects attained by practicing the present disclosure, reference should be made to the accompanying drawings that illustrate exemplary embodiments of the present disclosure and to the description in the accompanying drawings.

In describing exemplary embodiments of the present disclosure and known technologies or repeated descriptions may be reduced or omitted to avoid unnecessarily obscuring the gist of the present disclosure.

Figure 1:
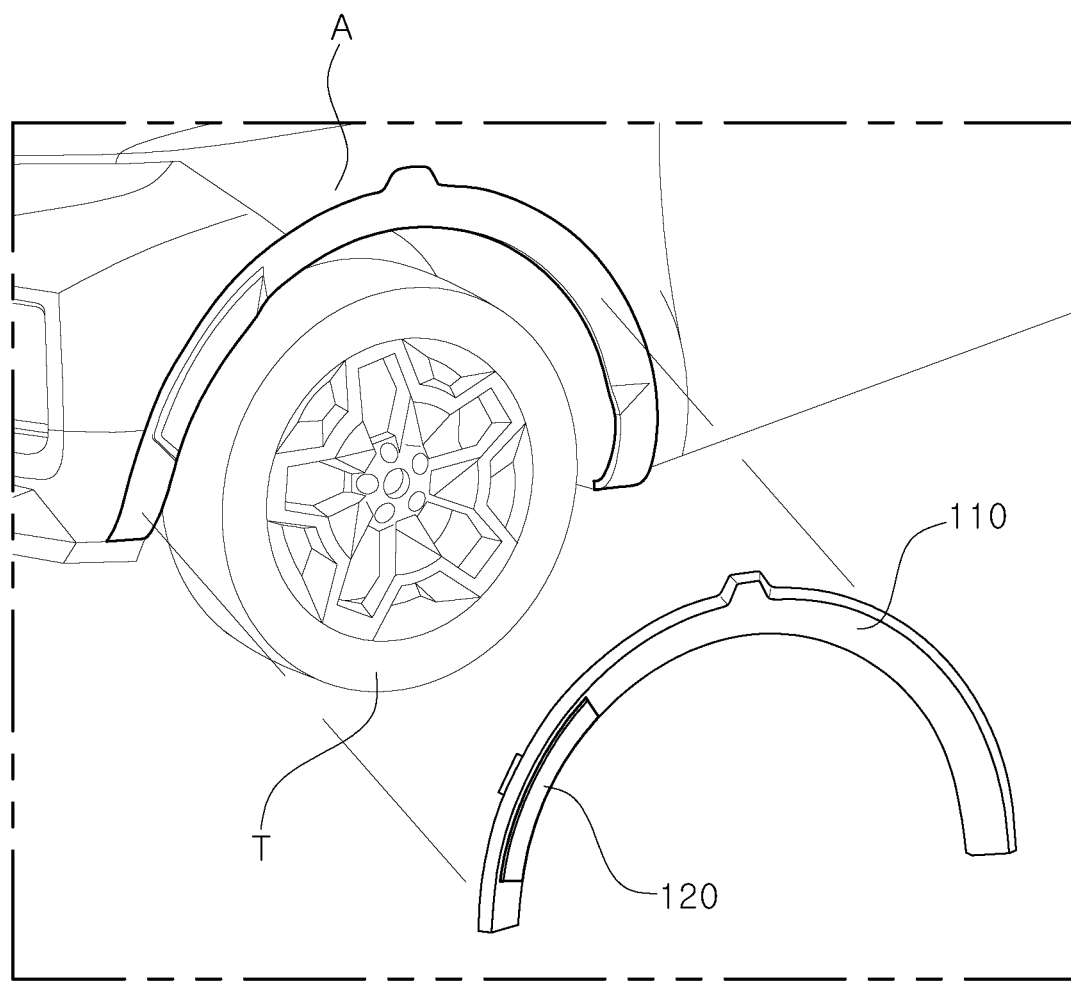
FIG. 1 is a diagram illustrating a variable wheel arch garnish of the present disclosure.
Figure 2:
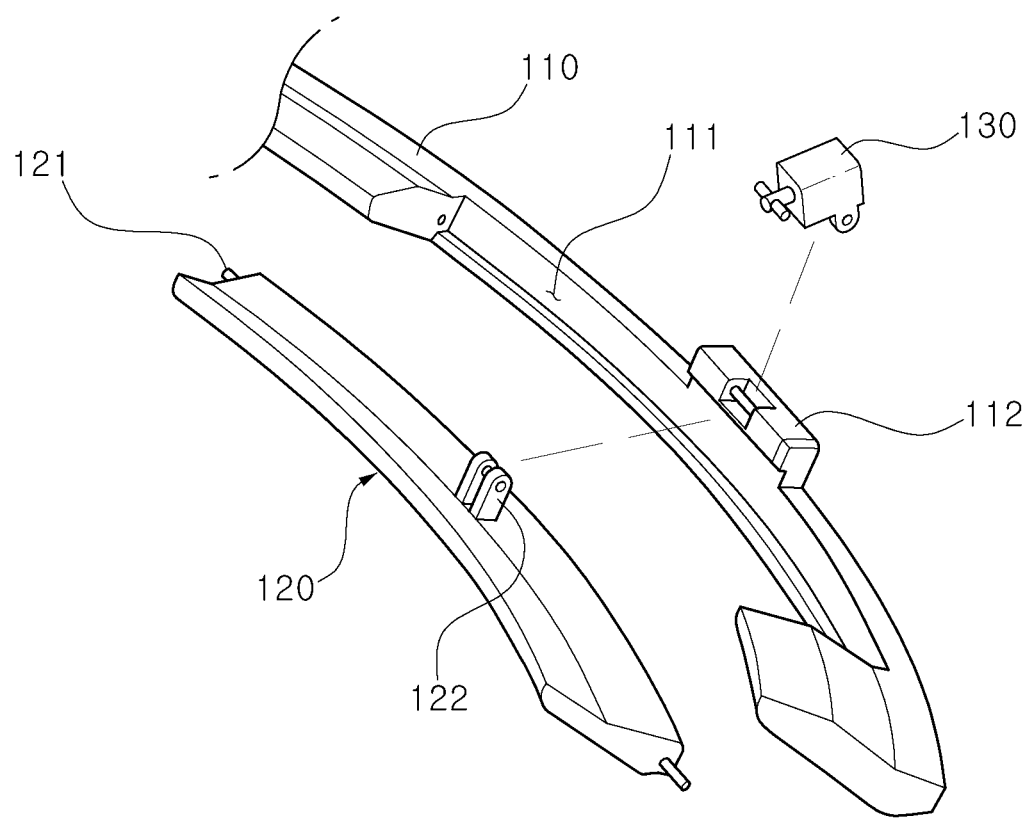
FIG. 2 is an exploded perspective view illustrating the variable wheel arch garnish of the present disclosure.

FIG. 1 is a diagram illustrating a variable wheel arch garnish of the present disclosure, and FIG. 2 is an exploded perspective view illustrating the variable wheel arch garnish of the present disclosure.

Hereinafter, a variable wheel arch garnish according to one embodiment of the present disclosure will be described with reference to FIGS. 1 and 2.

When a negative volume is applied so that a wheel arch garnish goes inside a vehicle, it can be an advantage in terms of design, but it can be disadvantageous to aerodynamic performance of the vehicle.

The present disclosure is intended to improve design as well as aerodynamic performance by applying a variable flap 120 to a wheel arch garnish 110 mounted on a wheel arch A of a vehicle.

As a result of adding a volume to a front portion of the wheel arch garnish in order to check the aerodynamic performance by the variable wheel arch garnish, it can be confirmed that aerodynamics is improved by about 6 counts as an exposure amount of the tire is reduced due to an increase in volume of a side surface of the wheel arch garnish. That is, when a garnish shape becomes an intaglio, the tire is exposed and thus the tire may look magnificent to be advantageous in terms of design, but as an air flow interferes with the tire, aerodynamics can be significantly deteriorated. However, when the garnish protrudes as embossment, the exposure amount of the tire is reduced and thus aerodynamic performance is improved.

To this end, the variable wheel arch garnish assembly of the present disclosure includes an arc-shaped wheel arch garnish 110 mounted on an outer surface of a wheel arch surrounding a wheel and a tire T and connected to a vehicle body, and a flap 120 for improving aerodynamics is rotatably mounted on a flap mounting groove 111 formed on an outer surface of a front portion of the wheel arch garnish 110.

That is, as shown in FIG. 2, the flap 120 has an arc shape corresponding to the wheel arch garnish 110, fastening hinges 121 are formed to protrude from both ends of the flap 120, hinge grooves are formed on groove surfaces of both sides of the flap mounting groove 111 of the wheel arch garnish 110, and the fastening hinges 121 are fastened to the hinge grooves to be able to perform a rotation operation.

In addition, an actuator 130 is included to allow the flap 120 to be rotated about the fastening hinge 121, the actuator 130 is rotatably coupled to the actuator coupler 112 formed on a rear surface of the wheel arch garnish 110, and a driving rod of the actuator 130 is rotatably coupled to an actuator fastening portion 122 formed on a rear surface of the flap 120.

Thus, when the drive rod is stretched and retracted by the driving of the actuator 130, the flap 120 is rotated and opened in a side direction of the vehicle.

In addition, the driving of the actuator 130 is controlled by a controller provided in the vehicle, and the controller may separately control a degree of opening and an opening angle of the flap 120 by proportionally controlling the actuator 130.

Hereinafter, an operating state of the variable wheel arch garnish assembly of the present disclosure will be described with reference to FIGS. 3 to 6.

Figure 3:
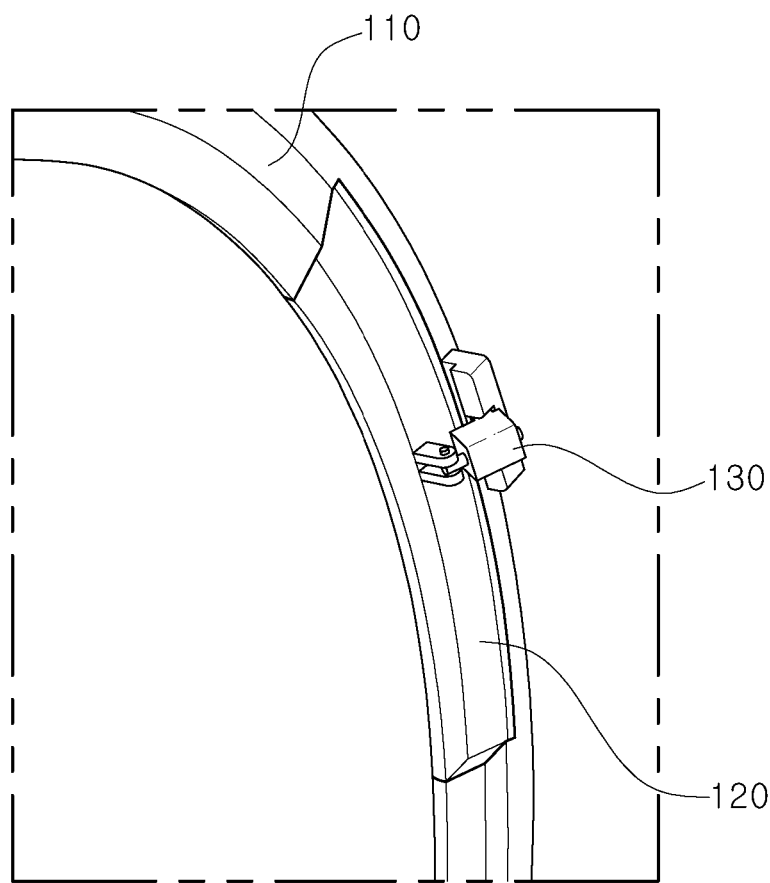
FIG. 3 is a diagram illustrating a non-operating state of the variable wheel arch garnish of the present disclosure.
Figure 4:
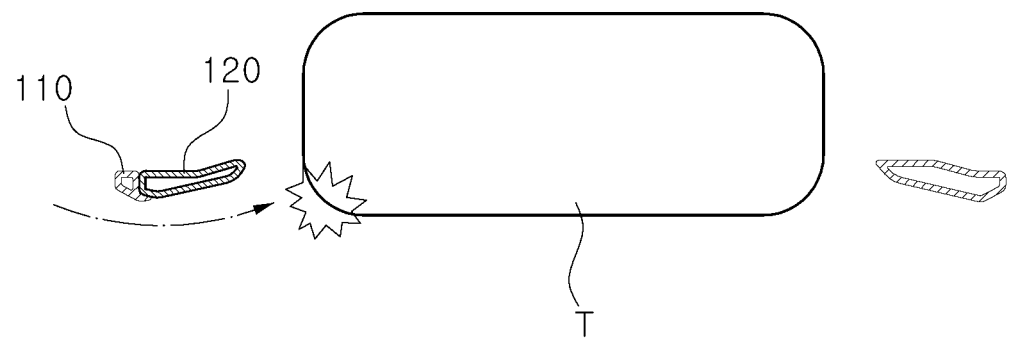
FIG. 4 is a diagram illustrating an air flow in the non-operating state.

FIG. 3 is a diagram illustrating a non-operating state of the variable wheel arch garnish of the present disclosure, the flap 120 is in a closed state, and the wheel arch garnish 110 and a skin surface of the flap 120 are matched to improve design completeness, but an air flows to the tire T as shown in FIG. 4, and thus aerodynamics is deteriorated.

Figure 5:
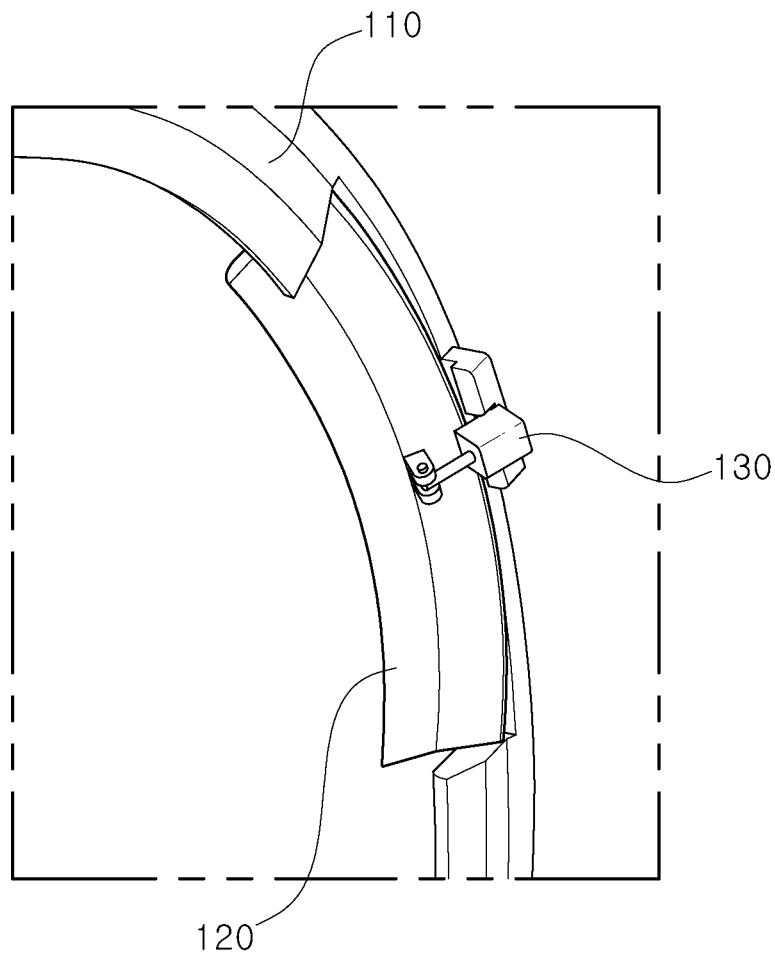
FIG. 5 is a diagram an operating state of the variable wheel arch garnish of the present disclosure.
Figure 6:
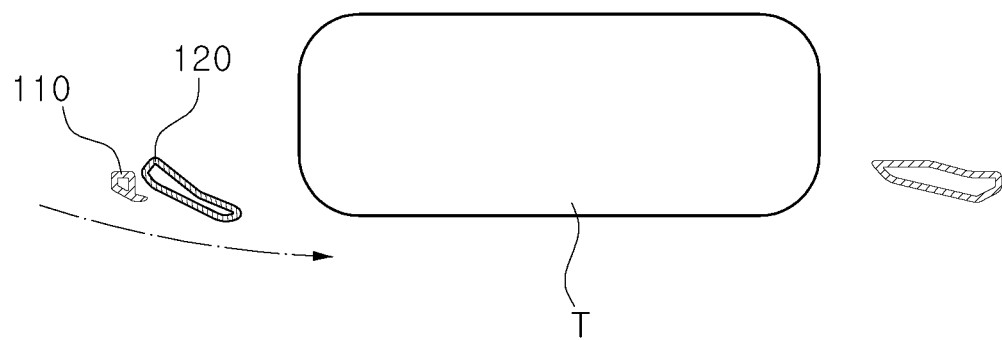
FIG. 6 is a diagram illustrating an air flow in the operating state.

On the other hand, FIG. 5 shows that the actuator 130 is operated by the controller and thus the flap 120 is opened in the side direction of the vehicle, and as shown in FIG. 6, the aerodynamics can be improved by inducing the air flow blowing from a front side to pass a side surface of the tire T.

According to the present disclosure, the aerodynamics can be improved by controlling the opening of the flap 120, and furthermore, the design aspect and the aerodynamics improvement aspect are simultaneously satisfied by adjusting the opening degree amount of the flap 120 according to a vehicle speed.

Figure 7:
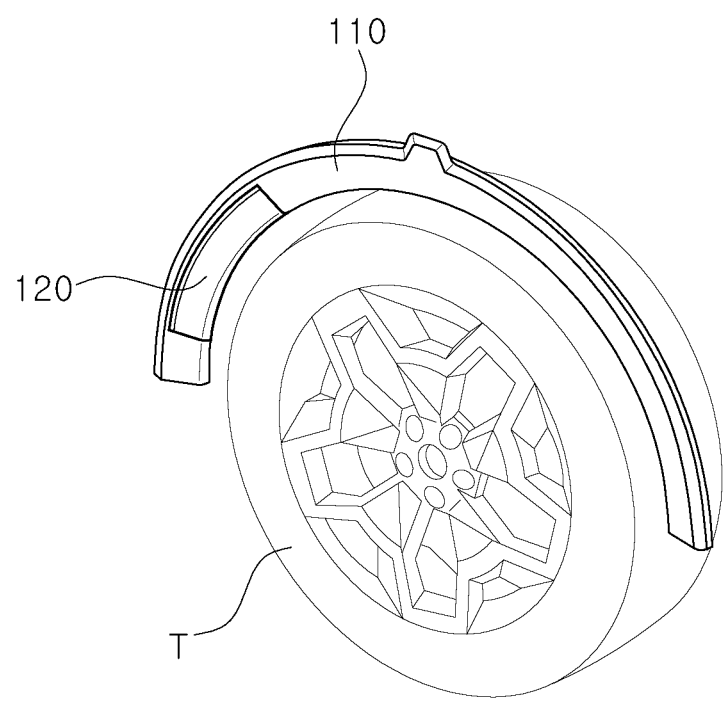
FIGS. 7, 8, and 9 are diagrams illustrating detailed operating states of the variable wheel arch garnish of the present disclosure.

That is, FIG. 7 shows a low speed traveling state (e.g., in a range of zero kph to 50 kph), and in this case, the flap 120 is closed. Since an effect of the wind is not significant in a low speed section, the design is considered to retract the flap inward so that the tire looks large and protruding.

Figure 8:
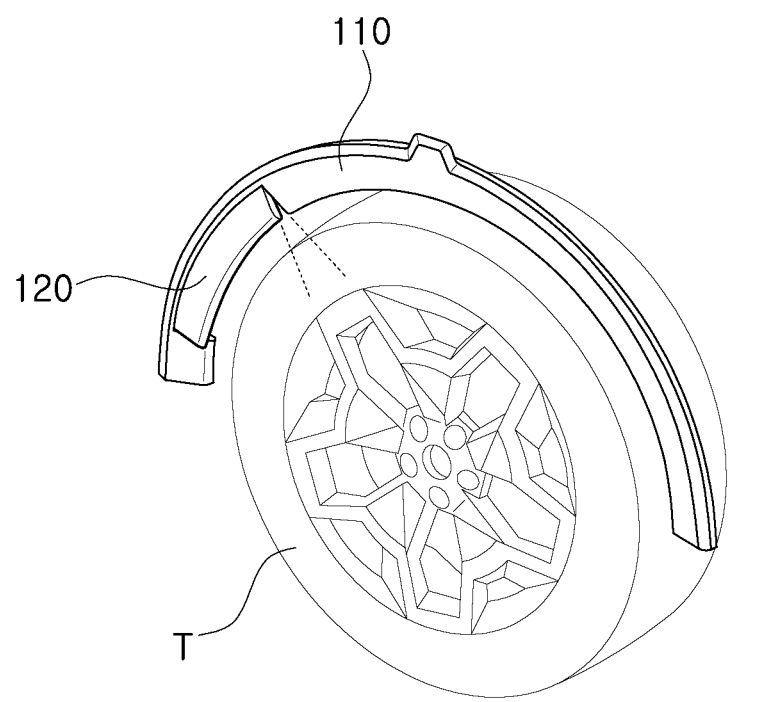
Figure 9:
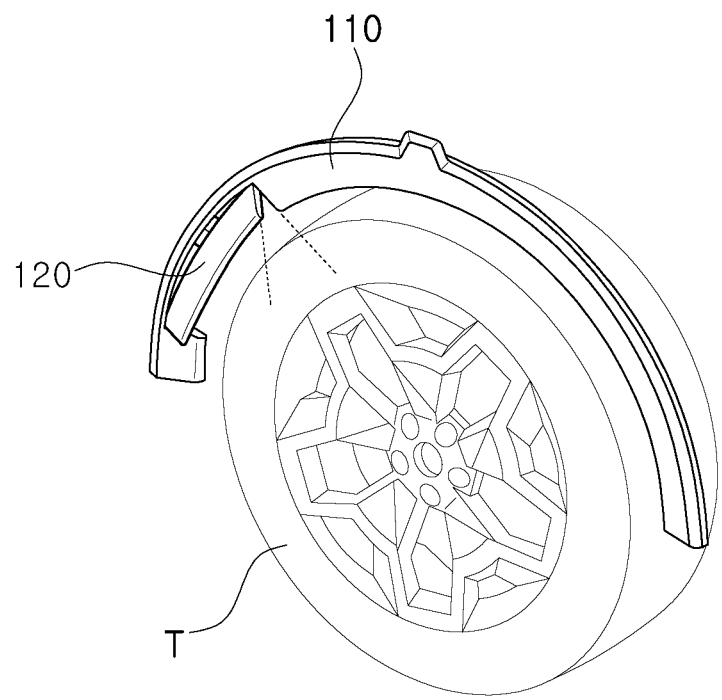

As shown in FIG. 8, the flap 120 starts to open at a medium speed (e.g., in a range of 50 kph to 100 kph), and the opening degree amount of the flap is controlled to increase as the vehicle speed increases at a high speed (e.g., in a range of 100 kph or more) as shown in FIG. 9. When the opening degree amount exceeds 15 degrees, the aerodynamics is deteriorated so that it is desirable to set a maximum opening degree amount within 15 degrees.

In addition, FIGS. 10 to 13 are diagrams for describing operating states during steering of a vehicle. That is, the above-described adjustment of the opening degree amount of the flap 120 may also be controlled in proportion to a steering angle.

Figure 10:
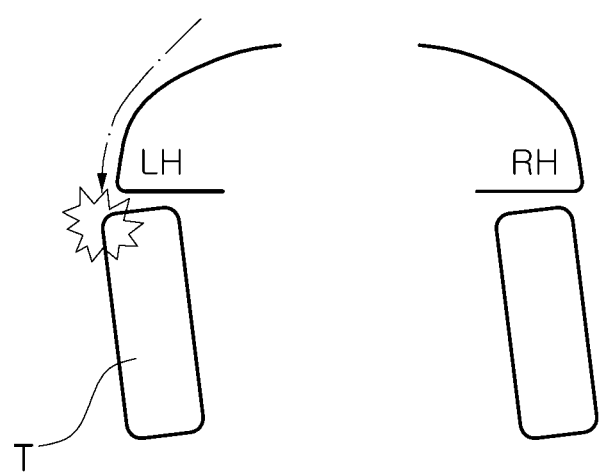
FIGS. 10, 11, 12, and 13 are diagrams for describing operating states during steering of a vehicle.

That is, FIG. 10 shows a case to which the present disclosure is not applied, and when the vehicle travels straight ahead, the tires are aligned within wheel houses, but when steered, the tires protrude to the outside in proportion to a steering angle, and thus the air flow collides with the tires to deteriorate air resistance.

Figure 11:
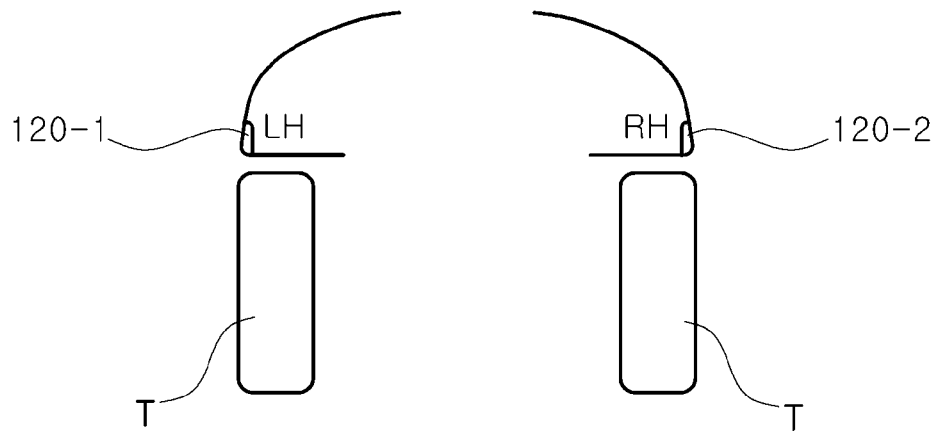

When the present disclosure is applied, as shown in FIG. 11, both a left flap 120-1 and a right flap 120-2 are not operated when the vehicle travels straight ahead.

However, according to the present disclosure, when a steering angle occurs at a predetermined level or more, a flap in a steering direction is controlled to be opened in proportion to the steering angle.

Figure 12:
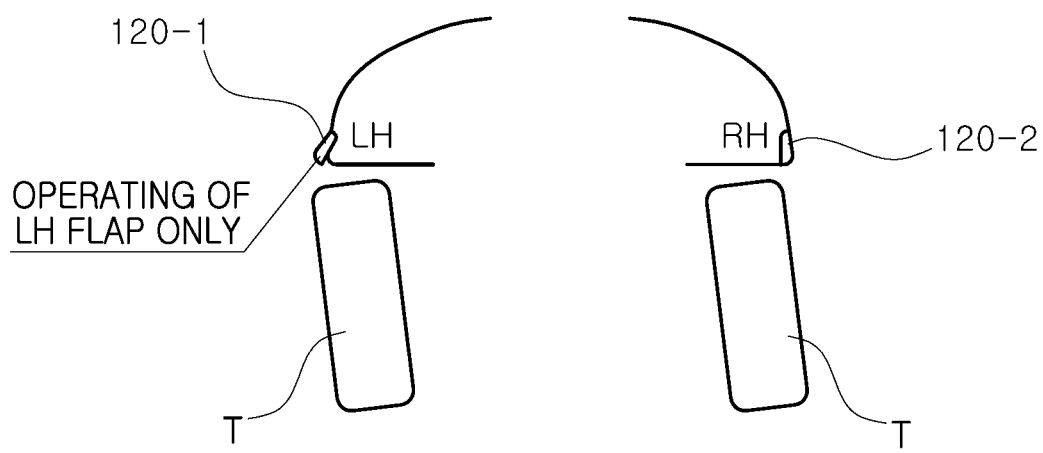
Figure 13:
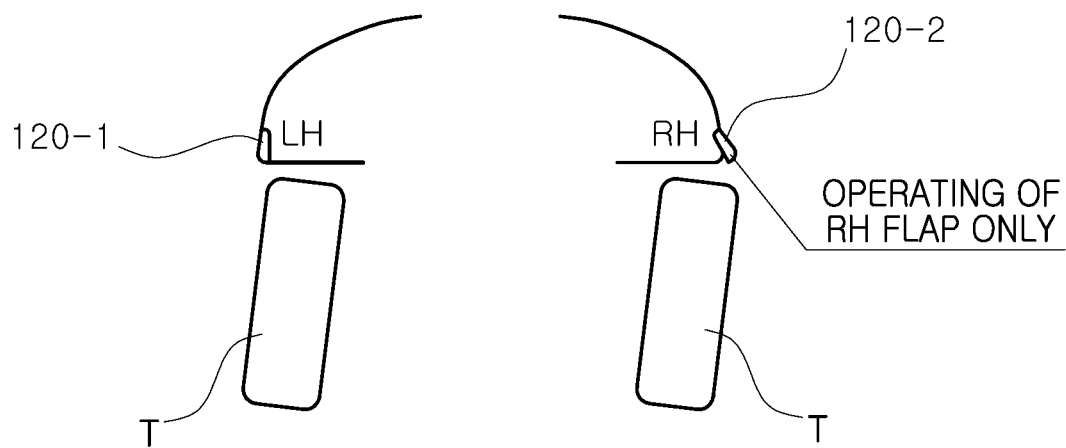

That is, when the vehicle turns to left as shown in FIG. 12, only the left flap 120-1 is opened in proportion to the steering angle, and when the vehicle turns to right as shown in FIG. 13, only the right flap 120-2 is opened in proportion to the steering angle so that the aerodynamics is improved.

Figure 14:
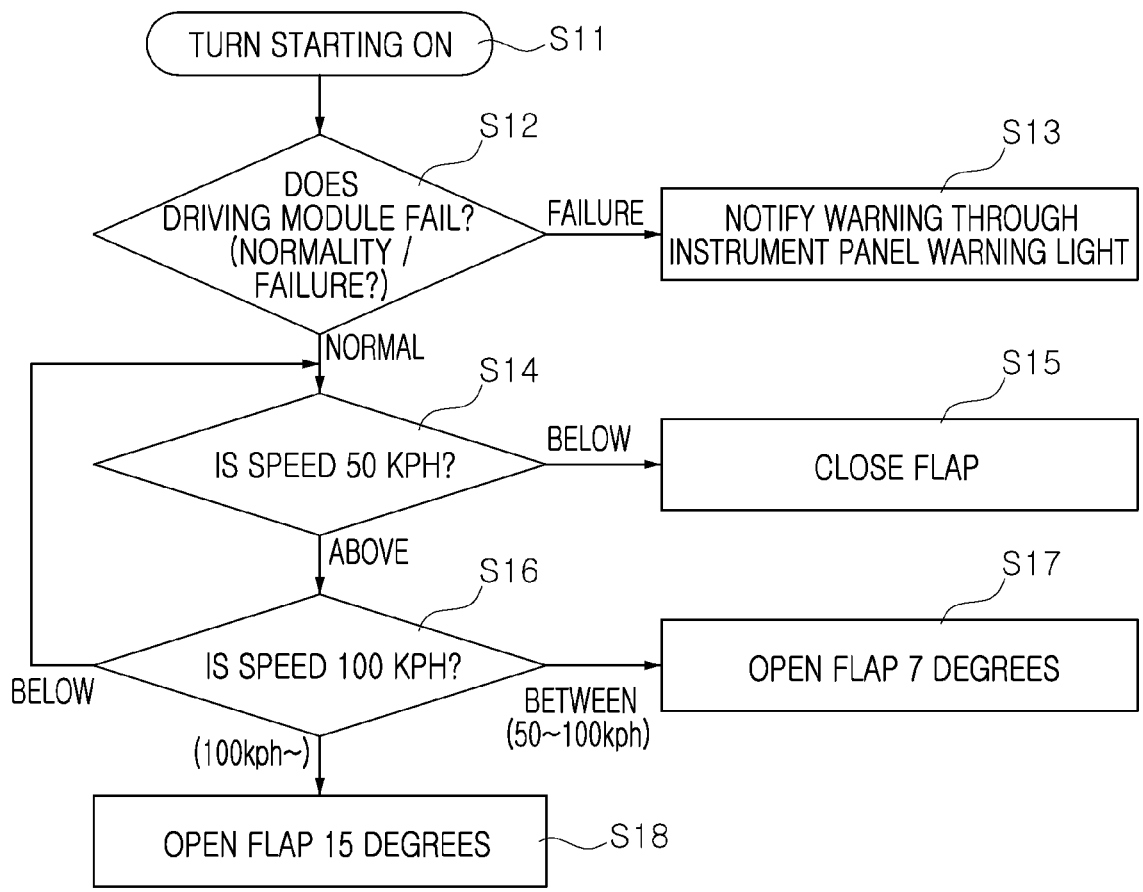
FIG. 14 is a flowchart illustrating a control method of a variable wheel arch garnish according to a first embodiment of the present disclosure.

Next, FIG. 14 is a flowchart illustrating a control method of a variable wheel arch garnish according to a first embodiment of the present disclosure. In the control method of a variable wheel arch garnish according to the first embodiment of the present disclosure, the controller may determine whether a driving module, that is, a component such as the actuator 130, fails (S12) in a state in which a starting is turned on (S11) and, when failing, the controller may notify a warning through an instrument panel warning light (S13).

Next, a vehicle speed is compared with a first reference value (S14). This is to control by distinguishing low speed traveling from high speed driving, and the first reference value may be, for example, 50 kph.

As the comparison result, when the vehicle speed is less than or equal to the first reference value, the flap 120 is closed by the actuator 130 (S15). That is, design is considered by moving the flap 120 inward the vehicle to match the skin surface of the flap 120 to the wheel arch garnish 110.

When the vehicle speed exceeds the first reference value as the determination result in S14, the flap 120 is opened by the actuator 130, and the vehicle speed is compared with a second reference value (S16), and thus a degree of opening may be differently controlled. The second reference value may be, for example, 100 kph.

That is, when the vehicle speed is less than or equal to the second reference value and the vehicle speed is larger than 50 kph and 100 kph or less, the flap 120 is opened to a middle open position of, for example, 7 degrees (S17), and when the vehicle speed exceeds the second reference value, the flap 120 is operated to be opened to a maximum open position of, for example, 15 degrees (S18).

Figure 15:
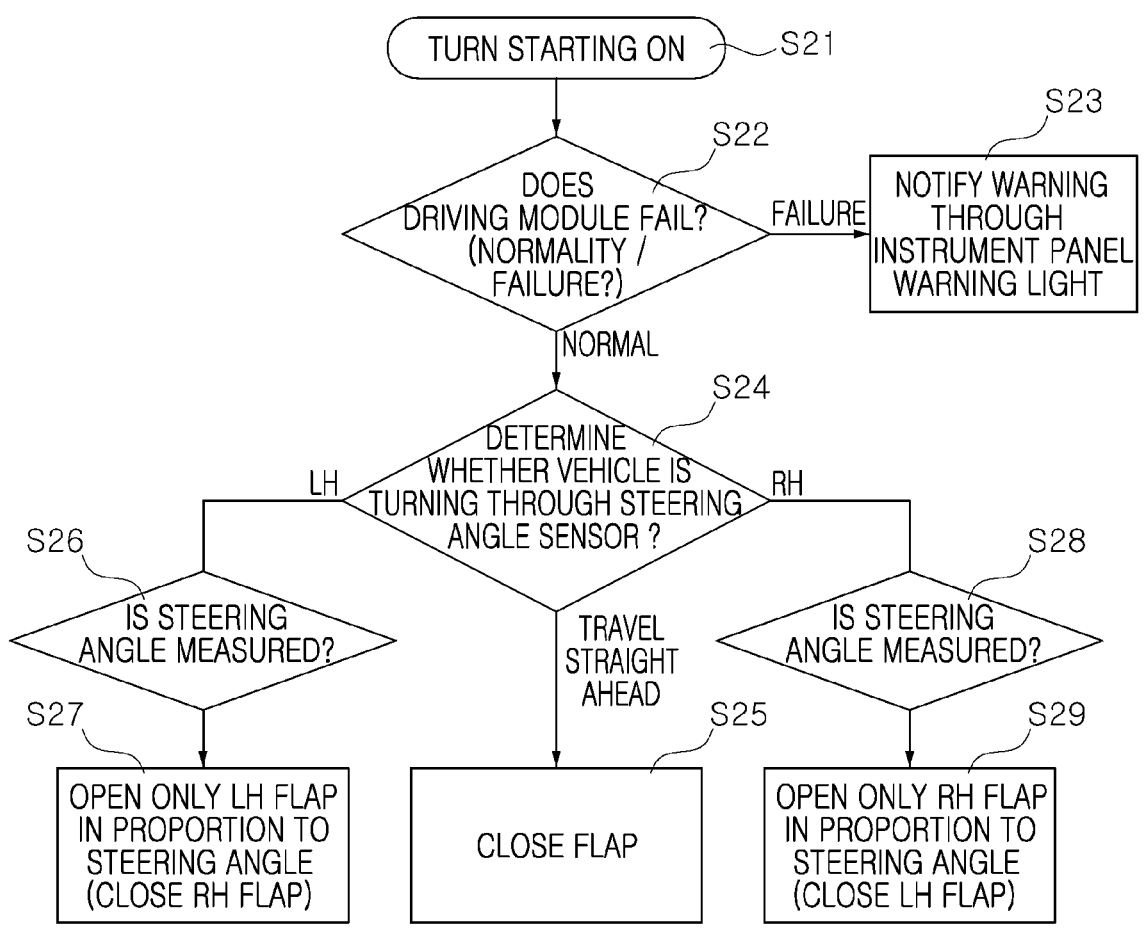
FIG. 15 is a flowchart illustrating a control method of a variable wheel arch garnish according to a second embodiment of the present disclosure.

Next, FIG. 15 is a flowchart illustrating a control method of a variable wheel arch garnish according to a second embodiment of the present disclosure. In the control method of a variable wheel arch garnish according to the second embodiment of the present disclosure, the controller may determine whether a driving module, that is, a component such as the actuator 130, fails (S22) in a state in which a starting is turned on (S21) and, when failing, the controller may notify a warning through an instrument panel warning light (S23).

Next, it is determined whether the vehicle is turning through a steering angle sensor (S24), and when the vehicle travels straight ahead, the flap 120 is closed (S25).

Then, as the determination result in S24, when the vehicle turns to left, a left turning steering angle is measured (S26), and only a left flap LH is proportionally opened in proportion to the left turning steering angle (S27).

Otherwise, as the determination result in S24, when the vehicle turns to right, a right turning steering angle is measured (S28), and only a right flap RH is proportionally opened in proportion to the right turning steering angle (S29).

As described above, in accordance with the variable wheel arch garnish assembly and the control method thereof according to the vehicle speed or the steering angle of the present disclosure, the aerodynamic performance of the vehicle can be further improved.

In accordance with the present disclosure, the effects described below can be obtained.

Improvement in Aerodynamic Performance

The present disclosure is characterized in that a flap is applied to a front portion of a wheel arch to guide an air flow blowing from a front side in order to prevent the air flow from colliding with a tire. At a low speed, the flap is retracted inward for an aesthetic effect of design to give a protruding and magnificent effect to the tire, and during medium and high speed traveling, the flap is opened to guide the air flow blowing from the front side in order to prevent the air flow from colliding with the tire. At a vehicle speed of 40 kph, an aerodynamics improvement effect is about 6 counts (front wheel arches), and when the flaps are applied to both front and rear wheel arches, more aerodynamics improvement effects can be expected.

Improvement in Design Performance

In the case of a fixed wheel arch garnish, a skin of a garnish should be pulled outward as much as possible to improve aerodynamics. However, in this case, since the tire looks small, it is difficult to easily reflect the design, but both the aerodynamics and design performance can be improved through the present disclosure.

While the present disclosure has been described with reference to the accompanying drawings, it will be apparent to those skilled in the art that various changes and modifications can be made without departing from the spirit and scope of the present disclosure without being limited to the exemplary embodiments disclosed herein. Accordingly, it should be noted that such alternations or modifications fall within the claims of the present disclosure, and the scope of the present disclosure should be construed on the basis of the appended claims.

The invention claimed is:

1. A variable wheel arch garnish assembly, comprising:
    a wheel arch garnish mounted on an outer surface of a wheel arch which surrounds a wheel, the wheel arch being connected to a vehicle body; and
    a flap rotatably coupled to an outer surface of the wheel arch garnish;
    wherein, when the flap is rotated and opened in a side direction of the vehicle, the flap changes a direction of an air flow from a front side of the vehicle.

2. The variable wheel arch garnish assembly of claim 1, further comprising:
an actuator coupled to a rear surface of the wheel arch garnish,
wherein a driving rod of the actuator is coupled to a rear surface of the flap, and the flap is rotated as the driving rod is stretched and retracted.

3. The variable wheel arch garnish assembly of claim 2, wherein a degree of opening of the wheel arch garnish is separately controlled by the actuator.

4. The variable wheel arch garnish assembly of claim 2, wherein the flap is rotatably coupled to an outer surface of a front portion of the wheel arch garnish.

5. The variable wheel arch garnish assembly of claim 4, wherein:
a flap mounting groove is formed on the wheel arch garnish;
a first fastening hinge protrudes from a first end of the flap and a second fastening hinge protrudes from a second end of the flap; and
the first and second fastening hinges are each inserted into hinge grooves formed on groove surfaces of each side of the flap mounting groove.

6. The variable wheel arch garnish assembly of claim 4, wherein, when the flap is closed, an outer surface of the flap and the outer surface of the wheel arch garnish are formed in parallel.

7. A control method of the variable wheel arch garnish assembly according to claim 2, comprising:
comparing a vehicle speed of the vehicle with a first reference value while the vehicle is traveling; and
when the vehicle speed exceeds the first reference value, opening the flap by the actuator.

8. The control method of claim 7, further comprising:
when the vehicle speed is less than or equal to the first reference value in the comparing of the vehicle speed with the first reference value, closing the flap.

9. The control method of claim 7, wherein, in the operating of the actuator to open the flap, a degree of opening of the flap is separately controlled.

10. The control method of claim 7, wherein the opening of the flap by the actuator includes:
comparing a vehicle speed of the vehicle with a second reference value; and
when the vehicle speed exceeds the second reference value, controlling the flap at a maximum opening angle.

11. The control method of claim 10, wherein opening of the flap by the actuator includes, when the vehicle speed is less than or equal to the second reference value, controlling the flap at an intermediate opening angle that is less than the maximum opening angle.

12. A control method of the variable wheel arch garnish assembly according to claim 2, comprising:
determining whether the vehicle is turning while the vehicle is traveling; and
when the vehicle is in a turning traveling state, opening the flap by the actuator.

13. The control method of claim 12, further comprising:
as the determination result of whether the vehicle is turning, when the vehicle is in a straight traveling state, closing the flap.

14. The control method of claim 12, wherein, in the opening of the flap by the actuator, a degree of opening of the flap is separately controlled.

15. The control method of claim 12, wherein the opening of the flap by the actuator includes, when the vehicle is in a turning driving state to left, opening a flap mounted on a left side of the vehicle among the flaps.

16. The control method of claim 15, wherein, in the opening of the flap mounted on the left side of the vehicle, the flap mounted on the left side of the vehicle is proportionally controlled to be opened in proportion to a left turning steering angle of the vehicle.

17. The control method of claim 12, wherein the opening of the flap by the actuator includes, when the vehicle is in a turning driving state to right, opening a flap mounted on a right side of the vehicle among the flaps.

18. The control method of claim 17, wherein, in the opening of the flap mounted on the right side of the vehicle, the flap mounted on the right side of the vehicle is proportionally controlled to be opened in proportion to a right turning steering angle of the vehicle.

* * * * *